US010769290B2

(12) United States Patent
Crawford et al.

(10) Patent No.: US 10,769,290 B2
(45) Date of Patent: Sep. 8, 2020

(54) SYSTEMS AND METHODS FOR FRAUD DETECTION VIA INTERACTIVE LINK ANALYSIS

(75) Inventors: Stuart L. Crawford, Piedmont, CA (US); Chris Erickson, Michigan City, IN (US); Victor Miagkikh, San Francisco, CA (US); Michael Steele, Berkeley, CA (US); Megan Thorsen, Sunnyvale, CA (US); Sergei Tolmanov, Walnut Creek, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1268 days.

(21) Appl. No.: 12/175,858

(22) Filed: Jul. 18, 2008

(65) Prior Publication Data
US 2009/0044279 A1 Feb. 12, 2009

Related U.S. Application Data

(63) Continuation-in-part of application No. 12/117,441, filed on May 8, 2008, now abandoned.
(Continued)

(51) Int. Cl.
*G06Q 30/00* (2012.01)
*G06F 21/62* (2013.01)
(Continued)

(52) U.S. Cl.
CPC .......... *G06F 21/6218* (2013.01); *G06F 21/55* (2013.01); *G06Q 10/10* (2013.01);
(Continued)

(58) Field of Classification Search
CPC ..... G06F 21/6218; G06F 21/55; G06Q 40/02; G06Q 10/10; G06Q 30/06; G06Q 30/0643;
(Continued)

(56) References Cited

U.S. PATENT DOCUMENTS 5,790,645 A * 8/1998 Fawcett et al. ............... 379/189
6,157,864 A 12/2000 Schwenke et al.
(Continued)

FOREIGN PATENT DOCUMENTS

WO WO-2007/059057 5/2007

OTHER PUBLICATIONS

Achohido et al.: "While he served abroad, his credit was under siege; Crooks exploit reporting system, Internet for newaccount fraud," [Final Edition] Acohido, Byron; Swartz, Jon. USA Today [McLean, Va] Jun. 5, 2007: B.1; Dialog #409004840, 7pgs. (Year: 2007).*
(Continued)

*Primary Examiner* — Robert M Pond
(74) *Attorney, Agent, or Firm* — Norton Rose Fulbright US LLP

(57) ABSTRACT

Fraud detection is facilitated by developing account cluster membership rules and converting them to database queries via an examination of clusters of linked accounts abstracted from the customer database. The cluster membership rules are based upon certain observed data patterns associated with potentially fraudulent activity. In one embodiment, account clusters are grouped around behavior patterns exhibited by imposters. The system then identifies those clusters exhibiting a high probability of fraud and builds cluster membership rules for identifying subsequent accounts that match those rules. The rules are designed to define the parameters of the identified clusters. When the rules are deployed in a transaction blocking system, when a rule pertaining to an identified fraudulent cluster is triggered, the transaction blocking system blocks the transaction with respect to new users who enter the website.

14 Claims, 14 Drawing Sheets

Related U.S. Application Data

(60) Provisional application No. 60/917,518, filed on May 11, 2007.

(51) Int. Cl.
| | | |
|---|---|---|
| *G06Q 40/02* | (2012.01) | |
| *H04L 29/06* | (2006.01) | |
| *G06Q 10/10* | (2012.01) | |
| *G06F 21/55* | (2013.01) | |
| *G06Q 30/06* | (2012.01) | |

(52) U.S. Cl.
CPC ......... *G06Q 30/06* (2013.01); *G06Q 30/0643* (2013.01); *G06Q 40/02* (2013.01); *H04L 63/1416* (2013.01); *H04L 63/1425* (2013.01); *G06Q 30/0601* (2013.01)

(58) Field of Classification Search
CPC ............ G06Q 30/0601; H04L 63/1416; H04L 63/1425
USPC ........................................ 726/26; 705/26, 27
See application file for complete search history.

(56) References Cited

U.S. PATENT DOCUMENTS

| | | | |
|---|---|---|---|
| 6,163,604 A | 12/2000 | Baulier et al. | |
| 6,487,666 B1* | 11/2002 | Shanklin | G06F 21/55 709/224 |
| 6,597,775 B2 | 7/2003 | Lawyer et al. | |
| 6,714,918 B2* | 3/2004 | Hillmer | G06Q 20/206 705/18 |
| 6,920,440 B1* | 7/2005 | Barson | H04M 3/533 706/15 |
| 7,050,932 B2* | 5/2006 | Selby | G06Q 40/08 702/179 |
| 7,072,863 B1* | 7/2006 | Phillips | G06Q 40/00 703/2 |
| 7,089,592 B2* | 8/2006 | Adjaoute | G06Q 20/04 726/1 |
| 7,203,315 B1* | 4/2007 | Livesay | 380/255 |
| 7,249,094 B2* | 7/2007 | Levchin | G06Q 20/10 705/35 |
| 7,263,506 B2* | 8/2007 | Lee | G06Q 20/04 705/318 |
| 7,471,780 B2* | 12/2008 | Bolt et al. | 379/114.14 |
| 7,606,168 B2* | 10/2009 | Robinson | G06Q 10/10 370/254 |
| 7,610,216 B1* | 10/2009 | May et al. | 705/18 |
| 7,627,543 B2* | 12/2009 | Lock | G06N 5/025 706/20 |
| 7,657,497 B2* | 2/2010 | Nandy | 706/45 |
| 7,865,427 B2* | 1/2011 | Wright | G06Q 20/04 705/35 |
| 7,940,899 B2* | 5/2011 | Moorman, III | G06Q 20/10 379/127.03 |
| 7,954,698 B1* | 6/2011 | Pliha | G06Q 40/02 235/379 |
| 8,065,227 B1* | 11/2011 | Beckman | G06Q 40/02 705/39 |
| 8,086,519 B2* | 12/2011 | Mylet | G06Q 20/40 705/37 |
| 8,639,522 B2* | 1/2014 | Pathria | G06Q 10/10 705/2 |
| 8,688,607 B2* | 4/2014 | Pacha | G06F 19/328 706/45 |
| 2002/0083168 A1 | 6/2002 | Sweeney et al. | |
| 2002/0161711 A1* | 10/2002 | Sartor et al. | 705/51 |
| 2003/0097320 A1* | 5/2003 | Gordon | 705/35 |
| 2005/0038737 A1* | 2/2005 | Norris | G06Q 20/10 705/39 |
| 2005/0222928 A1* | 10/2005 | Steier | G06Q 40/02 705/35 |
| 2005/0222931 A1* | 10/2005 | Mamou | G06F 17/30563 705/35 |
| 2006/0085434 A1* | 4/2006 | Mah | G06F 17/3089 |
| 2006/0099932 A1* | 5/2006 | Smith | H04Q 3/0025 455/412.1 |
| 2006/0149674 A1* | 7/2006 | Cook | G06Q 20/40 705/44 |
| 2006/0173957 A1* | 8/2006 | Robinson | G06Q 50/01 709/204 |
| 2006/0255125 A1* | 11/2006 | Jennings et al. | 235/380 |
| 2007/0039049 A1 | 2/2007 | Kupferman et al. | |
| 2007/0112667 A1* | 5/2007 | Rucker | G06Q 30/02 705/38 |
| 2007/0244782 A1* | 10/2007 | Chimento | G06Q 20/00 705/35 |
| 2008/0046362 A1* | 2/2008 | Easterly | G06Q 20/04 705/40 |
| 2008/0091453 A1* | 4/2008 | Meehan | G06Q 20/341 705/317 |
| 2008/0140599 A1* | 6/2008 | Pacha | G06F 19/328 706/47 |
| 2008/0275814 A1* | 11/2008 | Milana | G06Q 20/02 705/39 |
| 2009/0265211 A1* | 10/2009 | May et al. | 705/9 |
| 2011/0055074 A1* | 3/2011 | Chen | G06Q 20/10 705/39 |

OTHER PUBLICATIONS

International Search Report and Written Opinion for PCT Application PCT/US08/63229, dated Jul. 17, 2008, 13 pgs.

"Security Review: Captcha Systems", Online, Feb. 10, 2008, UW Computer Security Course Blog Retrieved from the Internet, retrieved on Apr. 21, 2009, 4 pages.

Extended European Search Report issued for European Patent Application No. 08253641.8, dated May 12, 2009, 6 pages.

\* cited by examiner

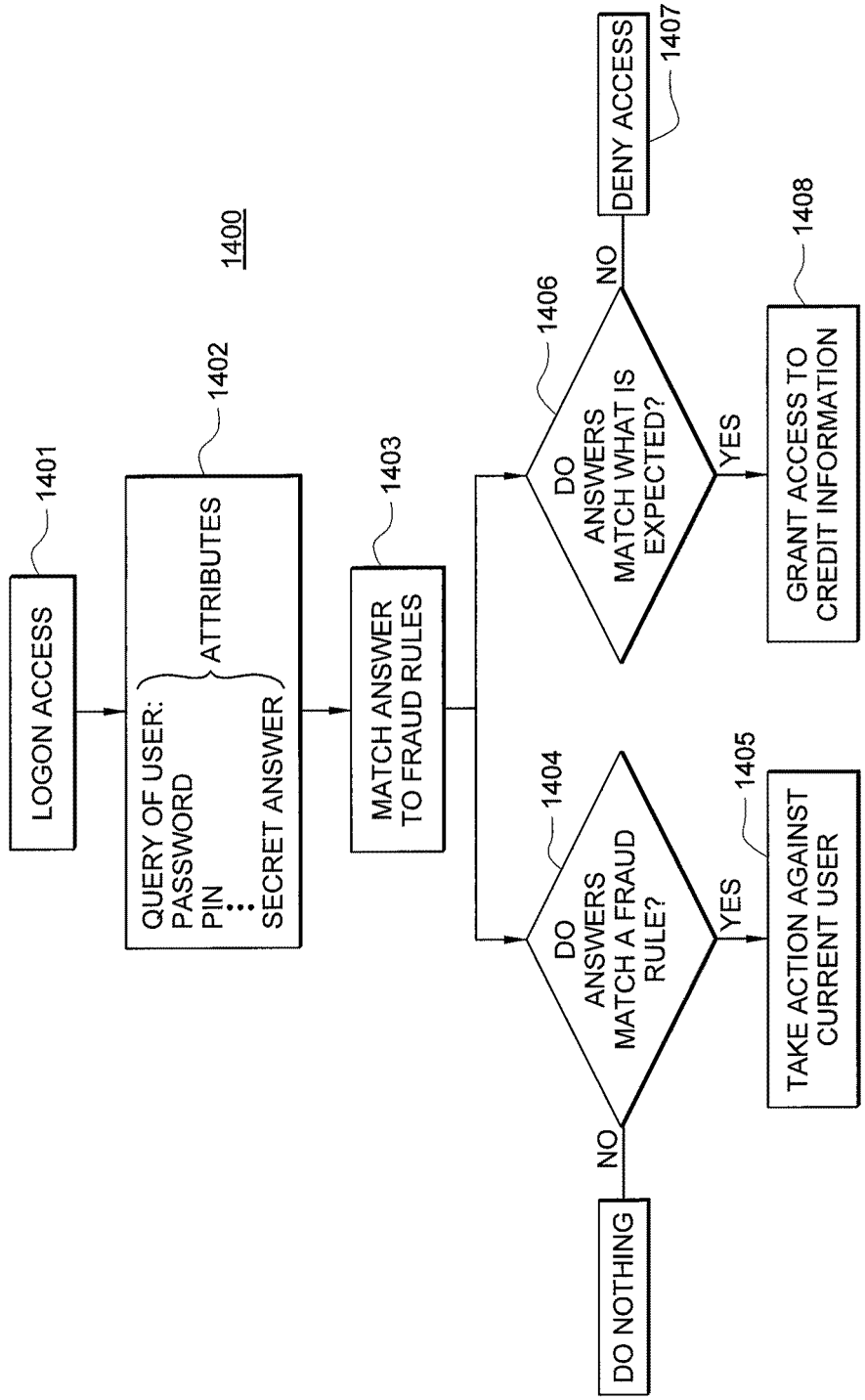

SYSTEMS AND METHODS FOR FRAUD DETECTION VIA INTERACTIVE LINK ANALYSIS

CROSS REFERENCE TO RELATED APPLICATIONS

This continuation-in-part application claims priority to U.S. Non-provisional application Ser. No. 12/117,441 filed May 8, 2008 titled "SYSTEMS AND METHODS FOR FRAUD DETECTION VIA INTERACTIVE LINK ANALYSIS," which application claims priority to U.S. Provisional Application No. 60/917,518 filed May 11, 2007 titled "SYSTEMS AND METHODS FOR E-COMMERCE FRAUD DETECTION," the disclosures of which are incorporated herein by reference.

TECHNICAL FIELD

This disclosure relates to fraud detection and more specifically to systems and methods for e-commerce fraud detection.

BACKGROUND OF THE INVENTION

E-commerce systems exist where members of the general pubic, using an Internet accessible website, can obtain sensitive information pertaining to individuals. Such information, by way of example, takes the form of credit histories and other credit sensitive data. These types of websites are prone to users trying to obtain (by fraudulent means) private information about others. Often, such attempts are made by imposters who have some, but not all, of the identification needed to identify a target. These imposters are trying to steal the target's identity.

In a typical scenario, the fraudster has obtained some piece of the target's personal information. Typically, this would be the target's name and perhaps his/her address. The fraudster then obtains a (typically stolen) credit card belonging to someone other than the target. The object then for the fraudster is to steal the full identity of the target. To do this the fraudster will make use of a website that provides access to a full range of credit history data pertaining to individuals. The fraudster will issue a query in the form of a credit report request.

Using this scenario, the fraudster creates an account on the website and then attempts to purchase a credit report belonging to the target using the stolen credit card number. In this scenario the fraudster is trying to pass him/her self off as the target. In order to obtain the report, the fraudster must go through an identity authentication process administered by one of the credit bureaus. In this process the fraudster engages in a computer-generated interview where a small number of questions are posed about some of the items that the real target would know about the credit report. Since the fraudster usually does not yet have access to sufficient information about the target and past credit transactions, the fraudster often fails the interview. Fraudsters being what they are, don't give up at this point.

The foiled fraudster then creates another account and tries again. Often the fraudster will use similar (but not identical) information to create each new account. This similar information can be, for example, password, security answer, e-mail address, credit card number, and the like. Once in a while, the imposter will succeed and obtain a target's credit report containing sensitive data that then facilitates the imposter's desire to trade off of the credit of the target.

The occurrence of clusters of many accounts that are similar enough to have possibly been created by the same individual is a strong indicator of potential fraud. Currently, trying to identify collections of similar accounts is a laborious and time consuming process which involves repeatedly querying the database for information and patterns.

BRIEF SUMMARY OF THE INVENTION

In the foregoing example, one wishes to identify clusters of entities (accounts) that are similar in nature. The presence of tightly connected clusters is indicative of fraud. While the example here (and subsequently in this document) is oriented around the clustering of accounts in an eCommerce database, the clusters could just as easily be collections of similar debit card transactions, similar insurance claims, similar credit card transactions, similar credit card applications, similar student loan applications, etc or any other entities where the occurrence of tight clusters of similar entities is indicative of fraud. Fraud detection is facilitated by using matching rules to uncover clusters of entities, by then generating cluster membership rules and converting those rules to database queries. The cluster membership rules are based upon an accumulation of links of various types and strengths between entities. In one embodiment, the entities are website accounts, clusters are identified, and the system then constructs cluster membership rules for identifying subsequent accounts that match the attributes of those clusters. The cluster membership rules are designed to define the parameters of the identified clusters. When the rules are deployed in a transaction blocking system, for example, when a rule that describes an identified cluster is triggered, the transaction blocking system blocks the transaction with respect to new users who enter the website.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 13 shows one embodiment of the operation of a pattern matcher generation system; and.

FIG. 14 shows one embodiment of the use of a fraud rule to block, in real-time, fraudulent activity with respect to an imposter attempting to obtain private data belonging to a target, from a database of such information.

DETAILED DESCRIPTION OF THE INVENTION

Figure 1:
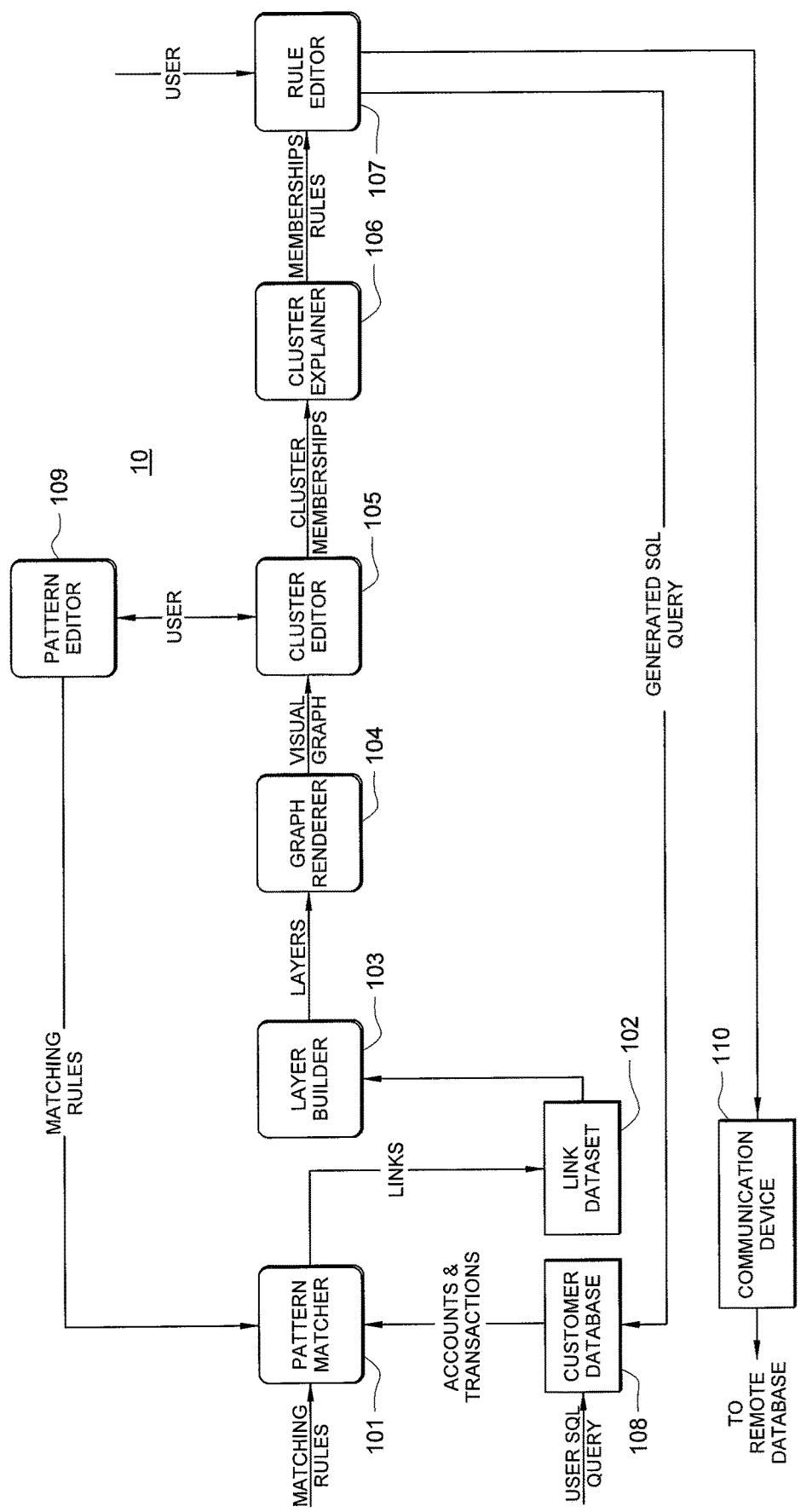
FIG. 1 shows one embodiment of a system for establishing rules for the detection of possible fraudulent transactions in accordance with concepts of this invention.

Turning now to FIG. 1, there is shown one embodiment 10 for practicing the invention. In operation, the user (system administrator) formulates and issues an SQL query against database 108 which is the database that stores entities of interest. In this particular embodiment, the entities correspond to customer accounts on a website, but the database could just as easily store entities corresponding to insurance claims, debit card transactions and the like. In this context, a query would, for example, allow the user to "select all of the entities created within the past 30 days, and extract all of the following fields, A through G, but exclude fields C and F." Basically, the query allows the user to extract the data for all of the entities created within the past 30 days, but to exclude some of this information because it is not important at that point in time.

The results of the query, namely the entities matching the SQL query, are then loaded into pattern matcher 101. The pattern matcher takes as its input previously established pattern matching rules. For example, a very simple pattern matching rule would say "in order for two credit card numbers to match, they must be identical." Another rule might say "in order for two e-mail addresses to match at least four letters or numbers of the information before the @ must match." A more sophisticated rule might reflect that "for two passwords to match, they must have a pair of identical substrings." That means that if you had one password that said "dogdog," and another password that said "catcat," those two passwords would match even though they are composed of different letters.

One can imagine many types of sophisticated matches, such as, for example, two passwords can match if they start with the first initial of the account holder's first name, followed by a two digit number, followed by the account holder's last name. Thus, "J12smith" would match with "d15jones." A pattern match generator, such as will be discussed with respect to FIG. 13, can be used when a user identifies a hitherto unknown pattern and wishes to construct a matcher able to match this new pattern.

Matching rules, such as discussed above, are utilized by the pattern matcher and all of the entities that match these rules are collected and linked together. For example, all of the accounts found by a rule that defines matching e-mail addresses could be linked. Also, all the accounts that are found by a rule that defines matching passwords could be linked, as could all the accounts that are found based on a rule that specifies matching credit card numbers. All of the accounts that are linked to other accounts on the basis of the matching rules are then written to the link dataset. The link dataset basically lists those accounts that are connected to other accounts by which types of links and at what strength.

Links have certain types. In the customer account example, some of the link types are: credit card number, password, e-mail address, etc. In addition, each link type has a numerical strength, indicating the degree to which a pattern associated with the particular link type is matched.

Each link type corresponds to a "layer" which is simply the way by which connected accounts for a particular link type are represented to the user. The link dataset is loaded into layer builder 103 which creates an internal data structure representing the way that those accounts are connected on each layer. Again, a layer means a type of link. For example, an e-mail address is a layer, a security answer is a layer, a password is a layer, and credit card number is a layer. Layer builder 103 builds the layers and describes the way in which the accounts are connected within each layer.

The layer information is then run through graph renderer 104 which generates a visual display so that the user, as will be discussed, can visualize the various links. Different colors assist in this visualization. The links are also shown with different width connectors representing the relative strength of the association. The user then can expand out on a layer-by-layer basis as will be discussed.

At a certain point, the user begins to identify what might be a cluster and then the user can add or remove accounts from the cluster as desired using cluster editor 105. When the user is satisfied with a cluster, the cluster can be automatically characterized by cluster explainer 106, with that characterization being represented by a decision tree. That decision tree can then be transformed to a corresponding SQL expression which can be applied to the database for later retrieval of additional matching accounts.

Cluster explainer 106 is used to automatically induce a set of cluster membership rules that identify the parameters that caused an account to be part of the identified cluster. For example, the rules might indicate that "to be a member of the cluster, the e-mail address must follow a certain pattern and the security answer must follow another pattern, and the account holder must be a resident in Bakersfield, and so on and so forth." These membership rules can be modified, if desired, by the user via rule editor 107.

The user can then transform a set of cluster membership rules into a SQL query and apply that query against customer database 108 effectively asking "see whether any accounts in the entire history of the database match the particular cluster membership rule set corresponding to the current cluster." What the user is effectively saying is "in this last month of data, a cluster of accounts has been identified that is suspicious. The suspicious account activity is defined by a set of rules that describe the attributes of accounts that are members of the cluster. Every account in the database is searched (via the cluster membership rule set expressed as a SQL query) in order to identify any other accounts that match the pattern described by the cluster membership rules. If found, those accounts are loaded, run through the pattern matcher and then displayed on the screen as were the previously loaded accounts. Then the user can once again enter into the exploratory state and perhaps further refine the cluster. This iteration can go on as long as the user desires Returning now to cluster editor 105, in addition to simply assigning accounts to clusters via the use of previously defined account matching rules (as discussed above) the user can use pattern editor 109 to create new pattern matching rule(s) based on patterns of data that have been hitherto unseen. For example, the user may notice a password that is characterized by a pattern of: the first letter of the account holder's first name, followed by the number 99, followed by the last letter of the account holder's first name, followed by 99, followed by the remainder of the account holder's surname. The user determines that this is an "interesting" password pattern. The user might then want to find out if there are any other accounts in the entire database that have a password patterns that match that one.

FIGS. 2 through 12 show one embodiment of typical screen shots encountered as a user works through the various aspects of the inventive concepts as taught herein.

Figure 2:
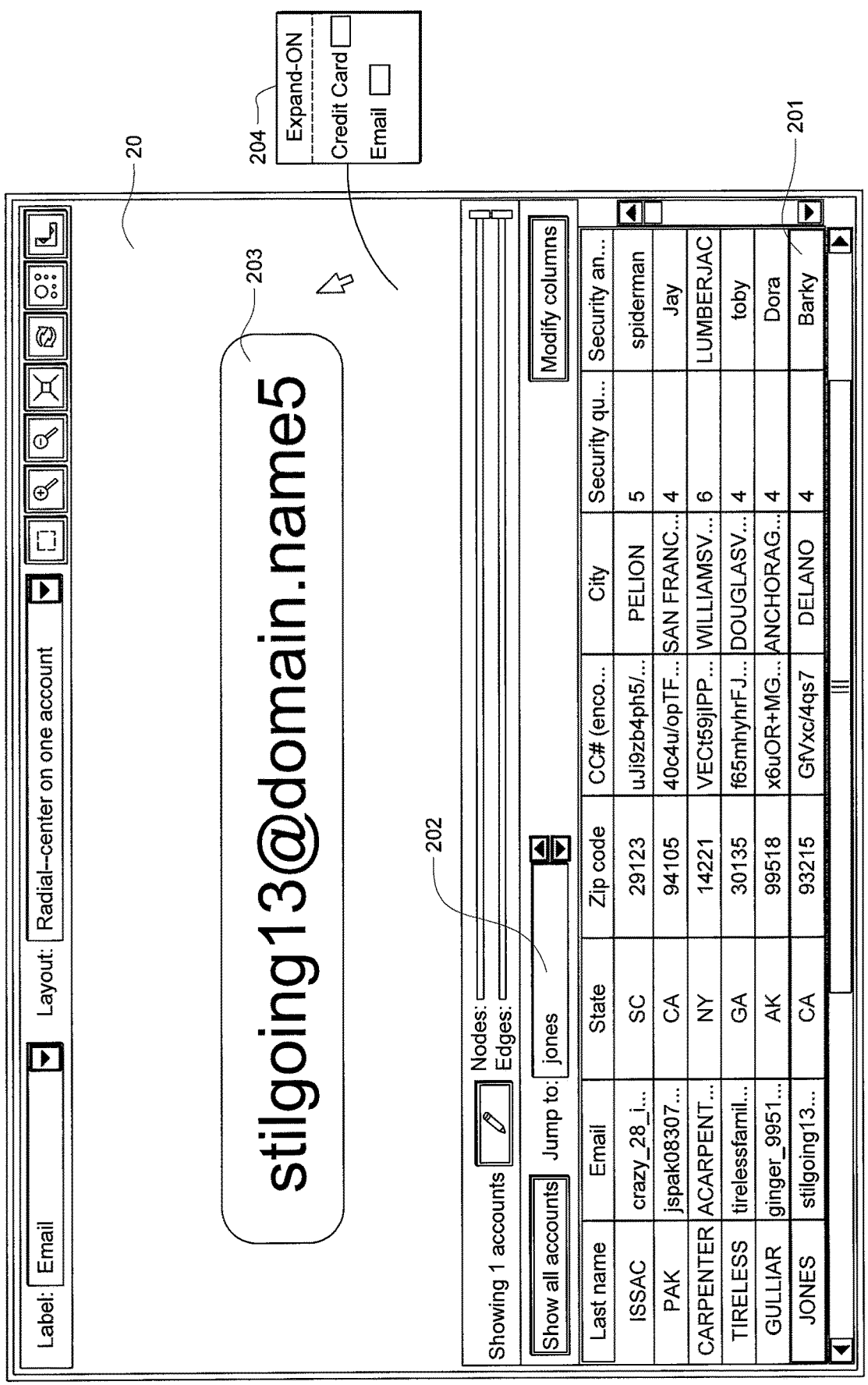
FIGS. 2 through 12 show typical screen shots as a user works through the various aspects of the invention.

FIG. 2 shows a common usage scenario which, in this view 20, is a screen shot indicating the initiation of a charge-back analysis. A charge-back occurs when a person calls the customer service system of the eCommerce website from which credit reports are purchased. That person is typically directed to the system by a credit card company when the person calls to complain that a charge on their credit card does not belong to them. In this example, the charge is for the purchase of a credit report that the caller did not knowingly make. This is typically (but not exclusively) how a search for a fraudster begins. In more general terms, the search for clusters of fraudulent activity typically begins with a "seed" entity that is somehow suspicious. Starting with that seed entity, the user interactively follows links that connect to other similar entities. In this particular embodiment, the seed entity is an account associated with the suspicious usage of a credit card. But the scenario could just as easily be one in which the seed entity is a debit card transaction or an insurance claim.

The search begins in this scenario with the user knowing the account which is associated with the credit card transaction in question (since each account is associated with one or more credit cards). The user also knows the true identity of the person whose credit report was purchased since the purchased credit report information is stored in association with the account.

In our example, the fraudulently purchased credit report belongs to a person named Jones as shown in line 201 of screen section 21. Screen section 21 contains the true names and credit card numbers (as well as other information) of a large number of persons. The system user then types "jones" in jump-to field 202 which then brings up an e-mail address 203 of, for example, stilgoing13@domain.name5. The user then can right click on screen 20 to show expand-on box 204. The user then selects "credit card" for further expansion. In this context, the process of expansion corresponds to displaying additional accounts linked to the currently displayed account by virtue of a credit card number that matches the credit card number for the currently selected account according to the matching rules for credit card numbers.

Figure 3:
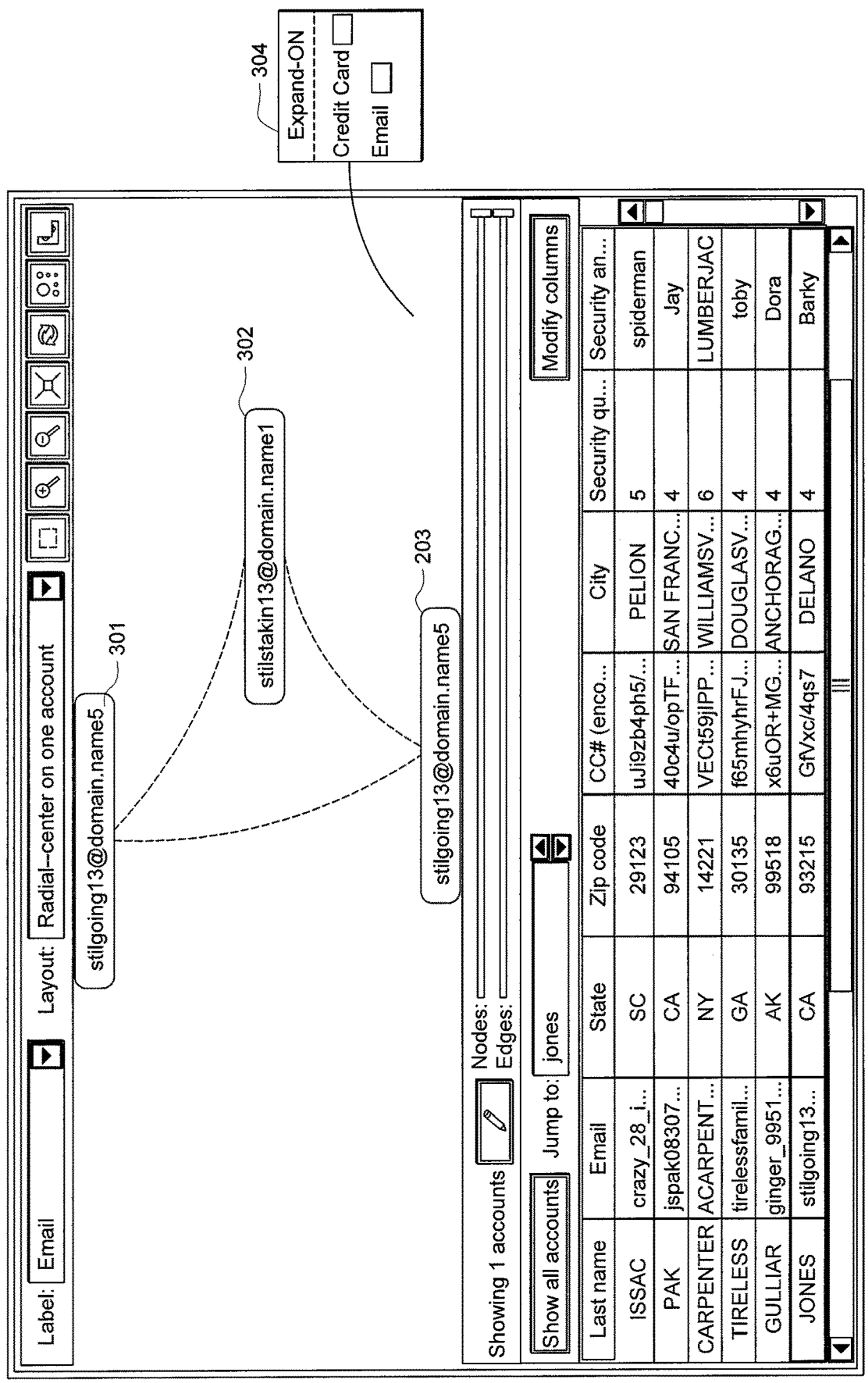

FIG. 3 shows the results of the expansion. In this case, there is shown three nodes 301, 302 and 303 each of which represents an account that matches the currently selected account based upon the matching rule for credit card numbers. Note that while "matching" in the context of credit cards means "exact match", "matching" is generally determined by matching rules specific to the layer (link type) being considered. They need not be exact matches and, in fact, are often "fuzzy" matches. As shown in FIG. 2, the nodes are inter connected (linked) by a line which is color coded according to the link type being matched. In addition, the thickness of the link is drawn in proportion to the strength of the match.

The user inspects the display, looking for similarities across the three nodes being displayed, and notices that the e-mail addresses for all of these nodes are similar. The user brings up expand-on box 304 and checks the "e-mail" box. This instructs the system to link to additional accounts that have email addresses that match any of the email addresses of the three visible nodes according to the matching rules that have been established for email addresses.

Figure 4:
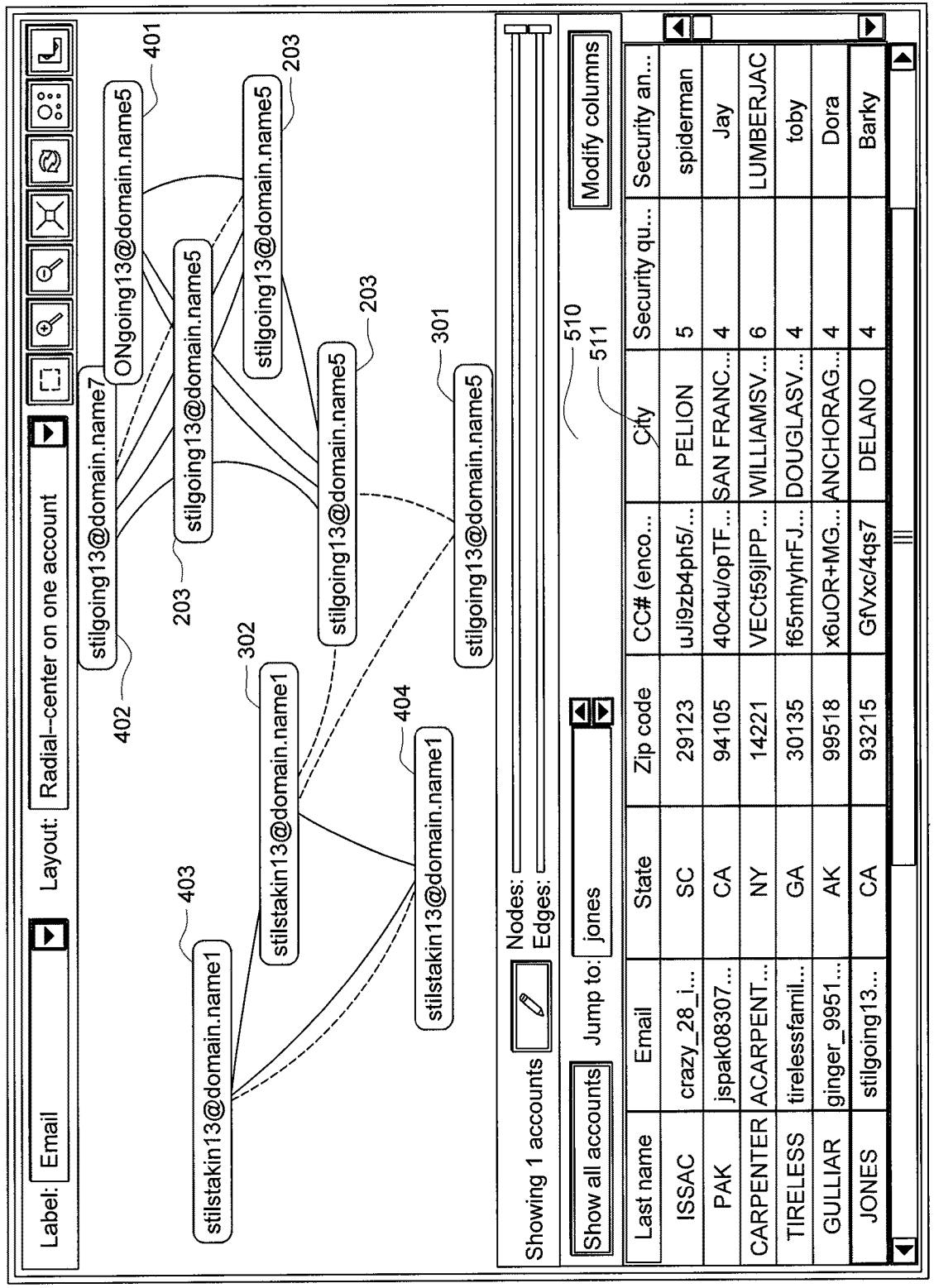
Figure 5:
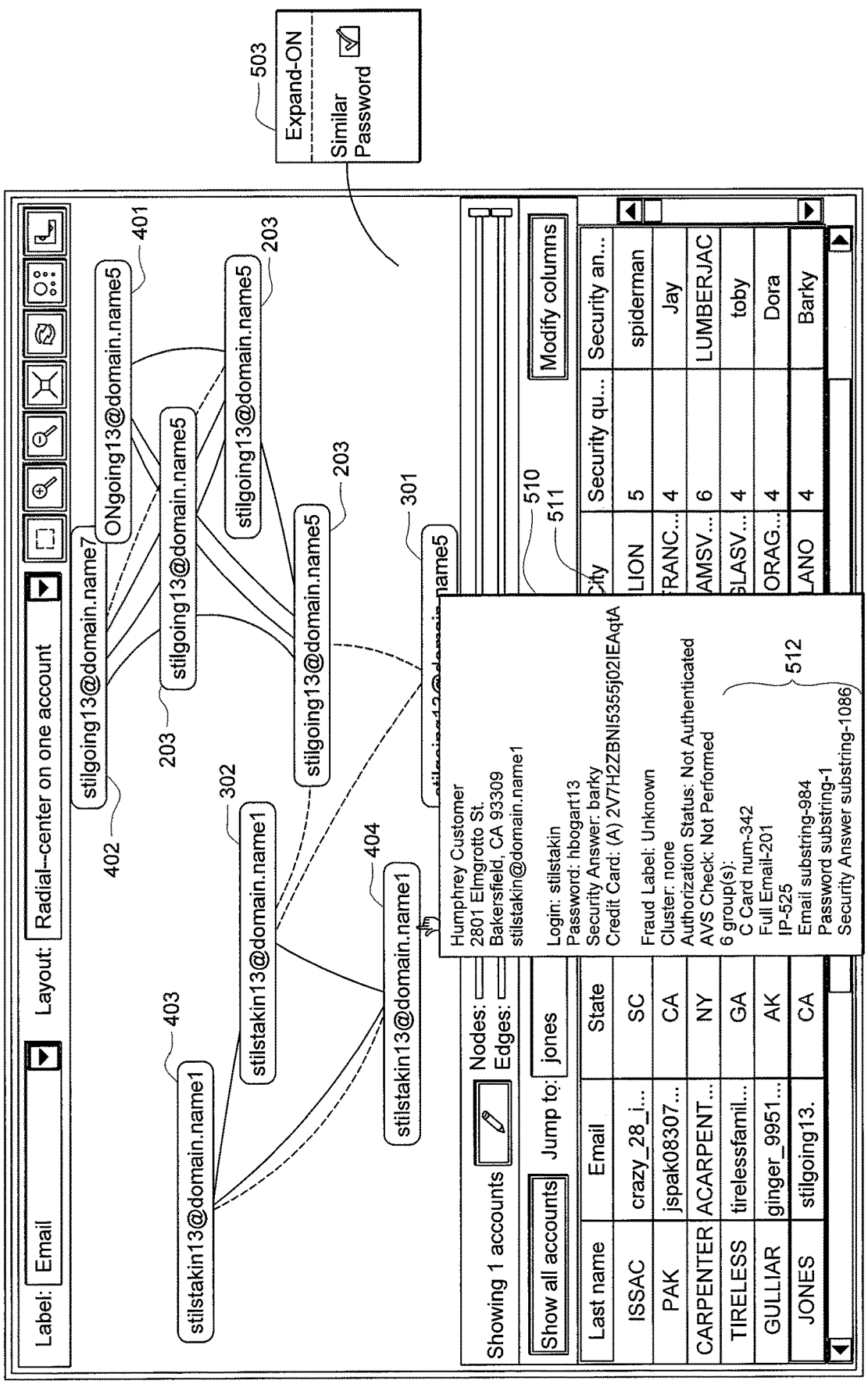

FIG. 4 shows several nodes interconnected by different colors (shown in the drawing as different line types), corresponding to the different match types. In particular, we see accounts linked by credit card and email matches. The user then can inspect the details of each account by, for example, rolling the mouse over the node corresponding to the account. The results from placing the mouse pointer over node 404 is shown in FIG. 5 by box 510. This then shows the credit card holder's name, address, e-mail address, login, password, security answer, credit card number (which is encrypted in the drawing) and a variety of other data.

The lines of section 512 indicate how this particular account is connected to other accounts. In this example, this node is connected to groups (unlabeled clusters), of matching credit cards, groups of matching email addresses, groups of matching IP addresses, etc.

The user can select all of the accounts displayed, and request that the characteristics of those accounts alone be displayed in a table below the graph display. By looking at this table, it can be observed that the selected accounts have similar passwords. By right clicking "similar password" in expand-on box 503, the user can then expand the graph to show those accounts with similar passwords.

Figure 6:
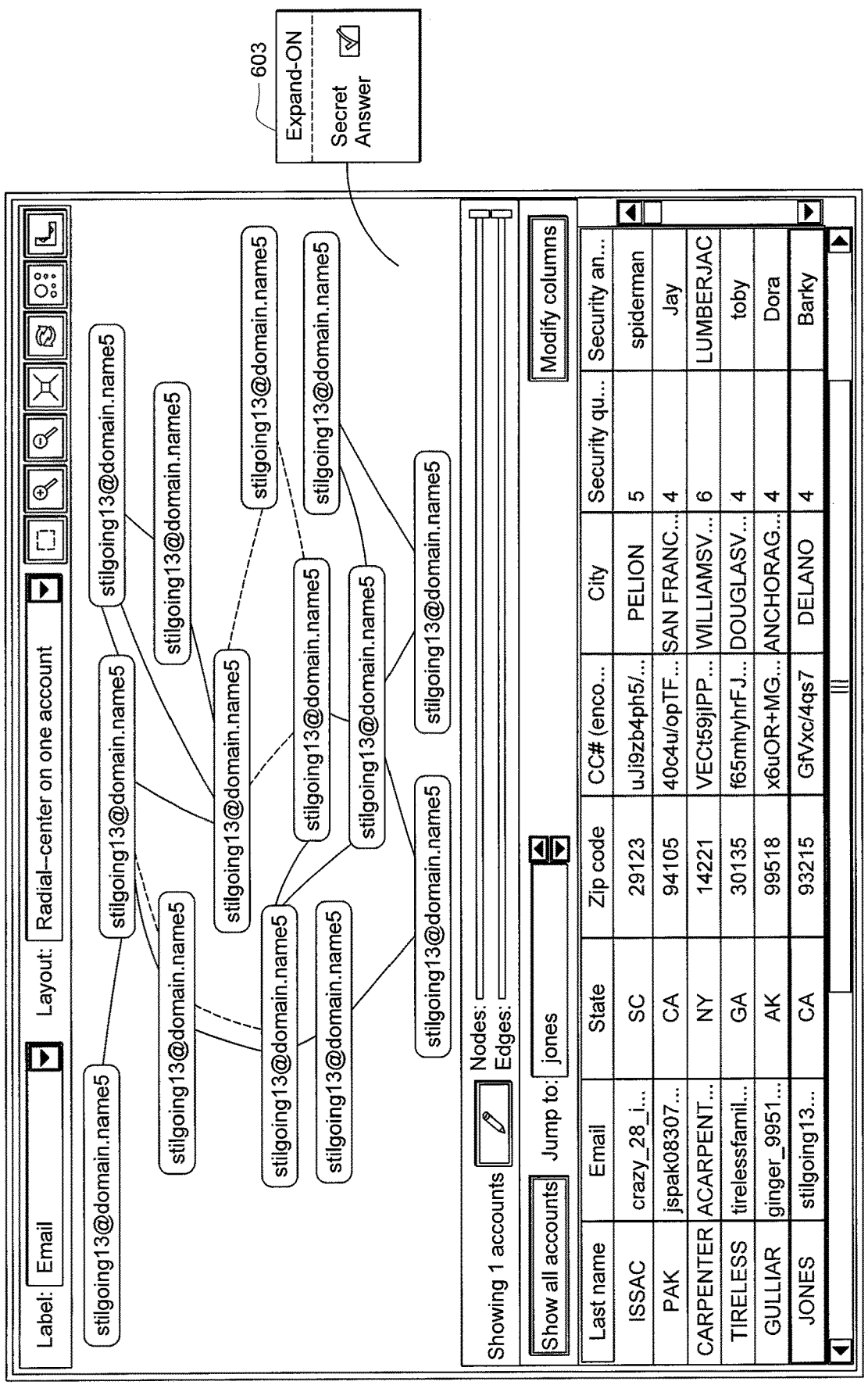

FIG. 6 shows a total of 14 accounts that are connected via similar passwords, credit card numbers and email addresses. By further investigation (via the table mechanism described above) it can be observed that they also have similarities in terms of their respective security answers. The user then uses expand-on-box 603 to enable the display (as shown in FIG. 7) of accounts linked on the basis of security answers.

Figure 7:
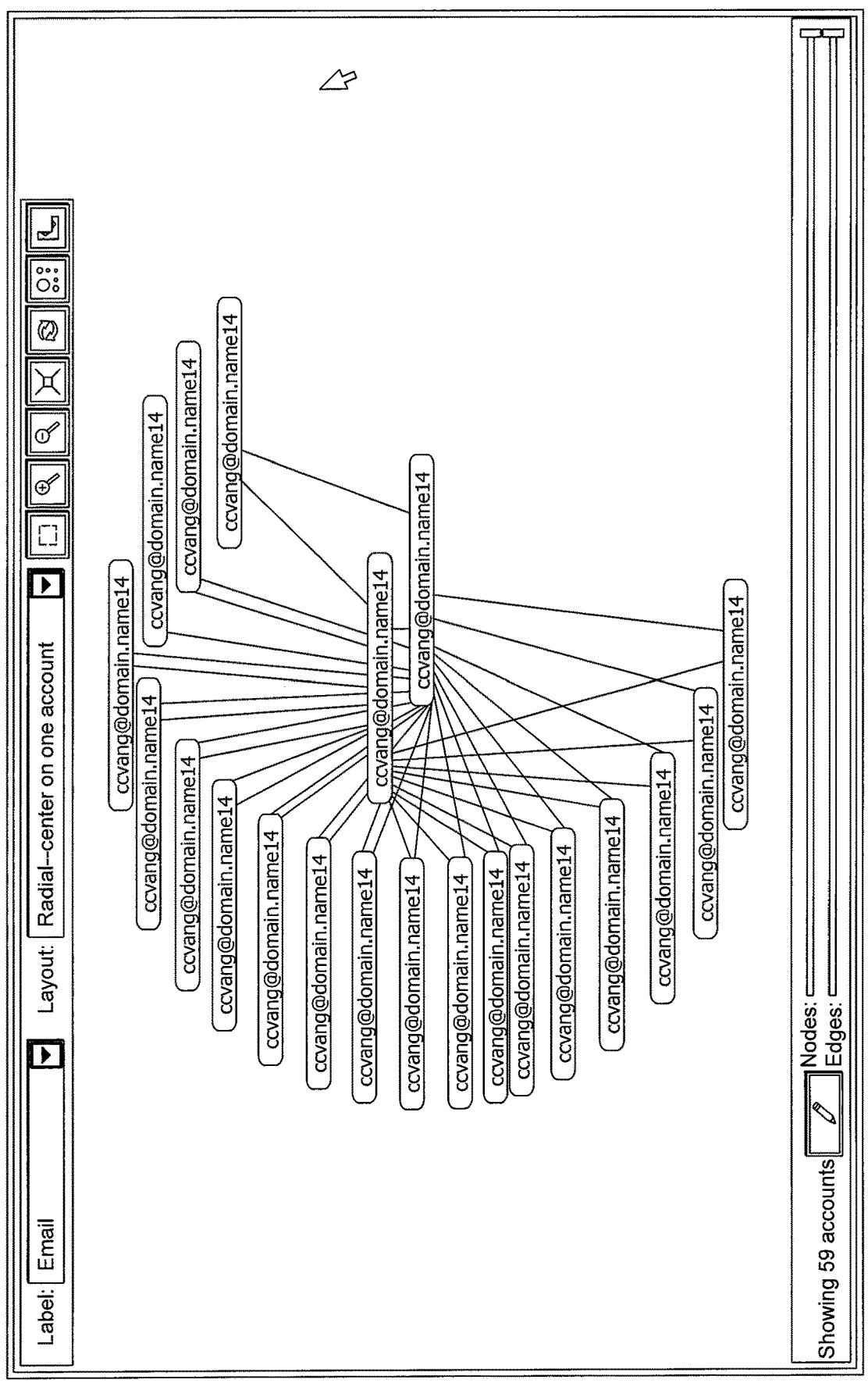

As shown in FIG. 7, the interconnecting links have now expanded to a point where it is difficult to focus on anything of value since it is all mostly hidden from view by the clutter. However, there are a number of different links that have some things in common. Because the links are colored, the overlapping colors intensify where many links of the same color intersect. Thus, the links that have the most in common have the most intense color and the links with the weakest interconnections have much less color intensity.

Saying this another way, when the color is intense, there are a number of common attributes, such as common passwords, common e-mails, common passwords, etc. Where the color intensity is less, the number of common attributes are less. Accordingly, it is possible to selectively remove links with less intense color from the screen by drawing a box around the undesired (for now) links, right clicking and responding to a prompt to remove the links within the box.

Figure 8:
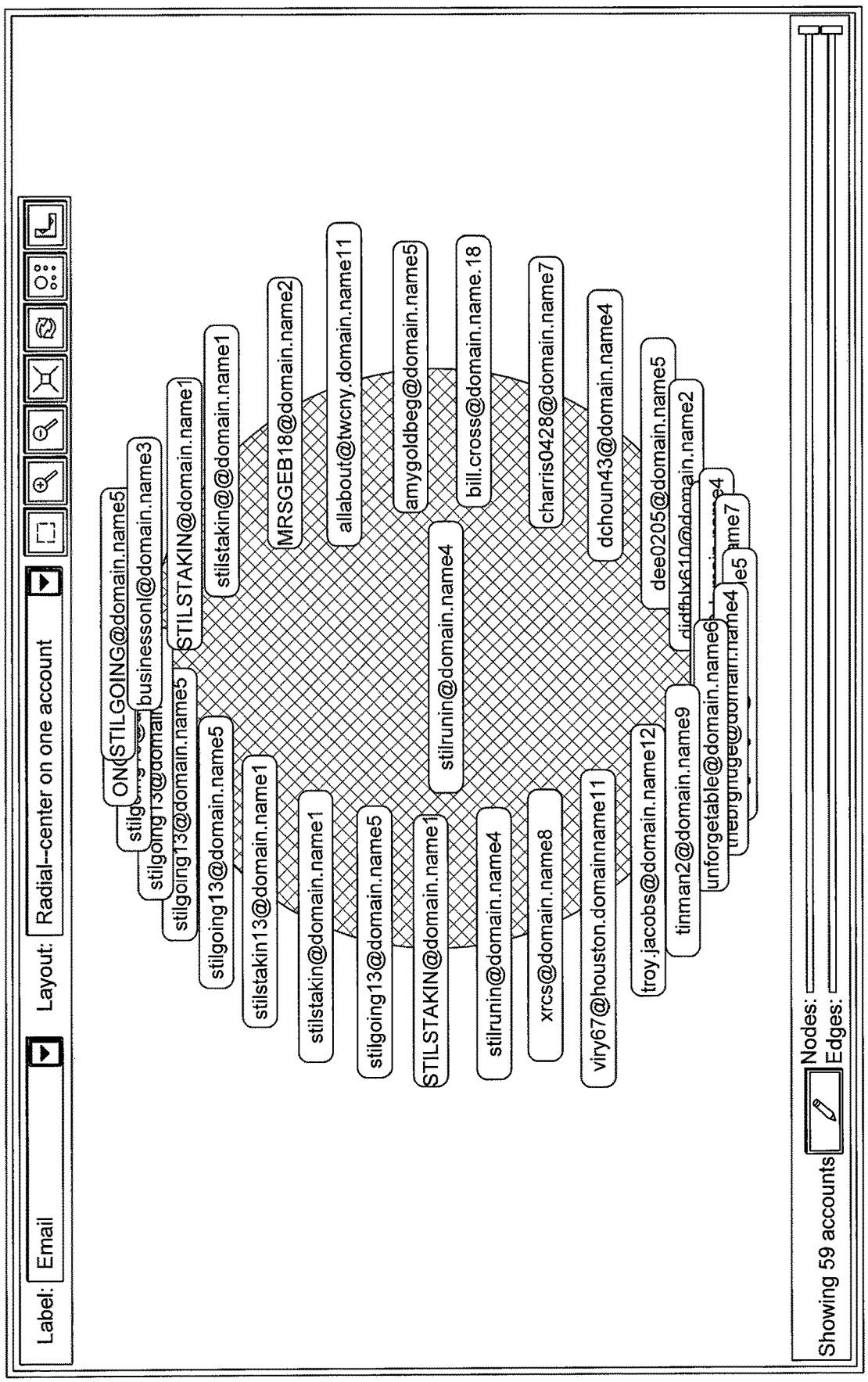

FIG. 8 is a screen of what remains after removing the loosely connected (less intense colored) sub-clusters. This screen shows e-mail addresses for the remaining accounts with a high number of interconnected links in the background. There are so many links on the security answer layer that it is difficult to see any other link types.

Figure 9:
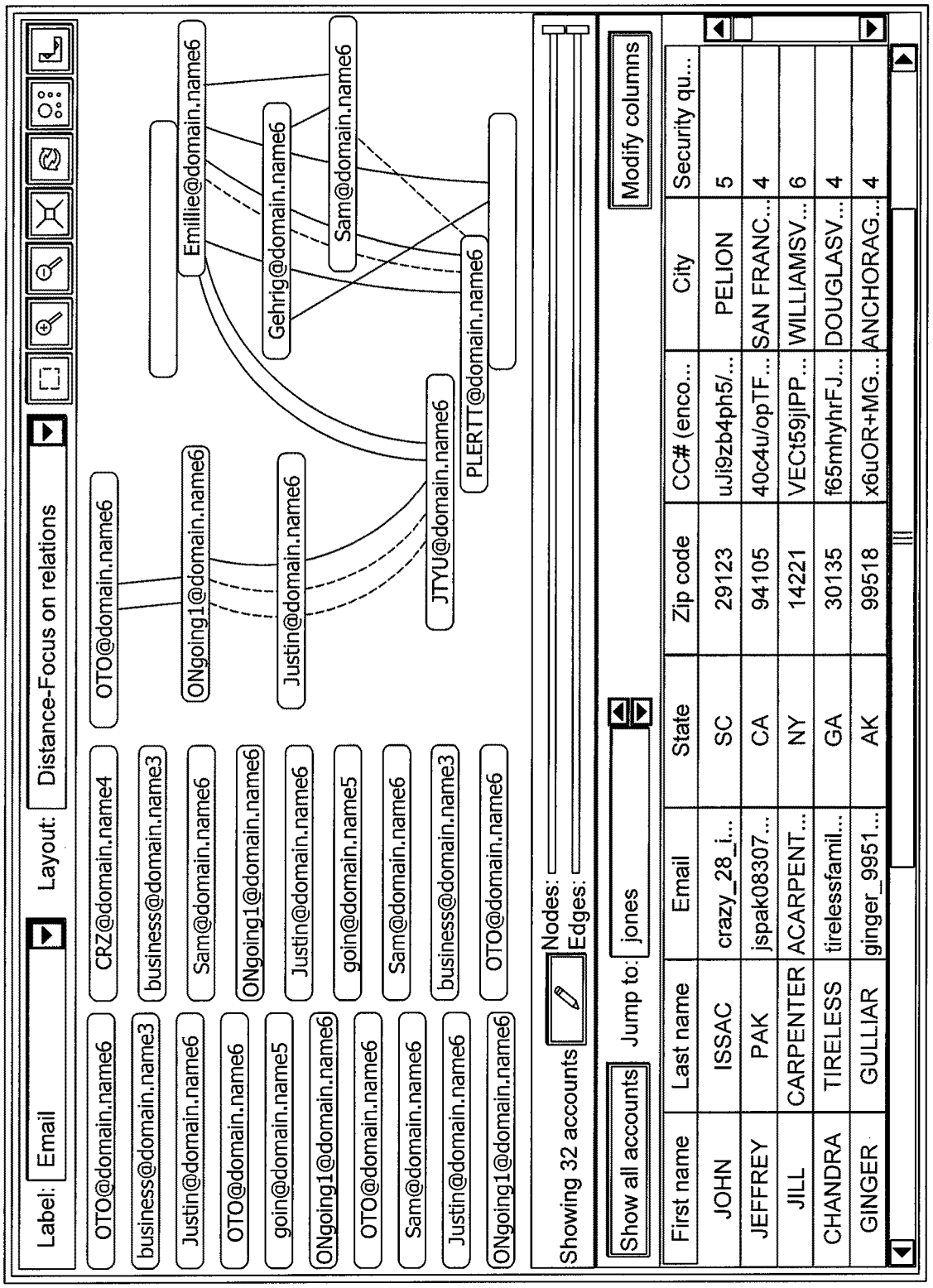

FIG. 9 then shows what remains after temporarily hiding the security answer connections for these accounts (so as to allow the user to see the links that were obscured by the preponderance of links on the security answer layer). There is presented a set of nodes 901 that are not connected at all, or do not appear to be connected. The set of nodes 901 are actually connected based upon the security answer, but the display of those links has been temporarily disabled. There is another group of connected accounts 902 that are nicely connected. By placing the cursor on each of them, the attributes of each of those accounts can be determined.

It is then determined that every one of the accounts in list 902 has Bakersfield as the home address. By then observing the accounts in list 901, it can be observed that they are from cities all over the country. The only common connection is that one account exhibits a Bakersfield address. Then, by removing all of the accounts that do not list Bakersfield as a home address, the display can be reconfigured as shown in FIG. 10.

Figure 10:
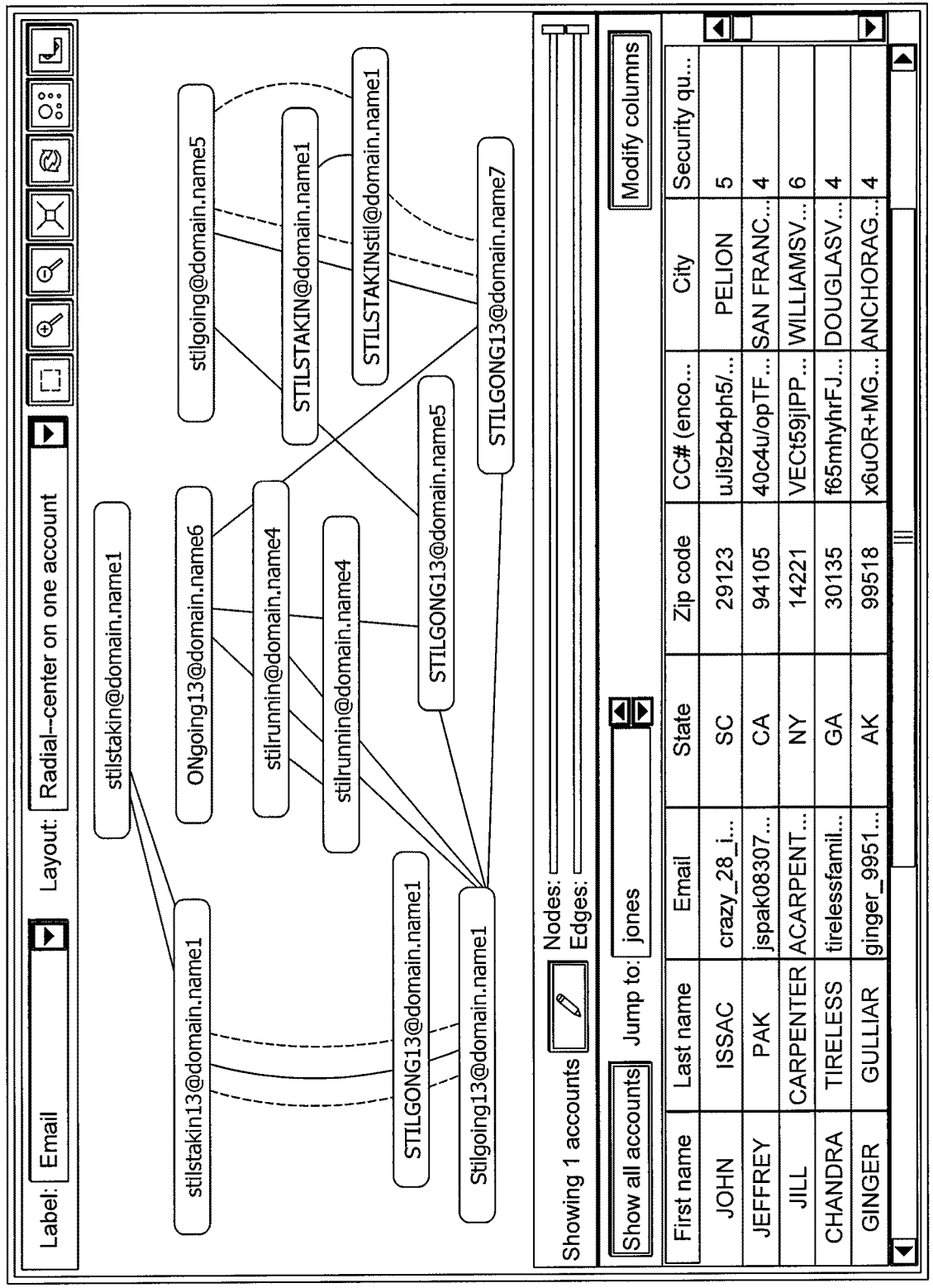

FIG. 10 now shows all of the accounts belonging to the potentially fraudulent cluster. By re-enabling the security answer layer, the display reveals that they are all connected. This display is then labeled as cluster 1010. Cluster 1010 can then be expanded to show all the interconnections.

Figure 11:
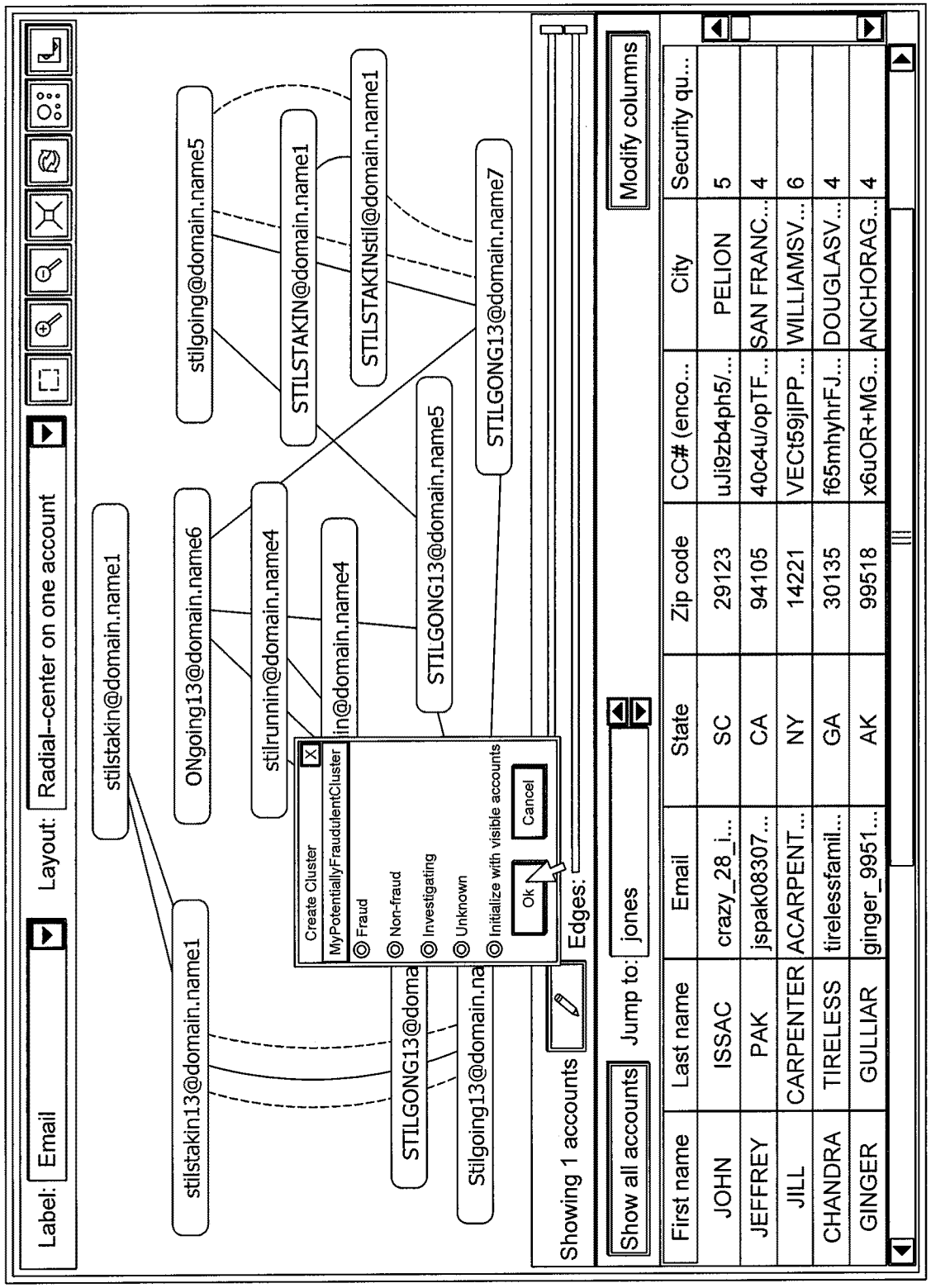

In FIG. 11, cluster 1010 has been expanded and given a name by cluster creator 1101. In the example shown, box 1102 is labeled "My Potentially Fraudulent Cluster." Once created, this cluster is then run through cluster explainer 106 (FIG. 1) which applies a commonly used machine learning algorithm (Classification and Regression Trees) to generate a decision tree.

Figure 12:
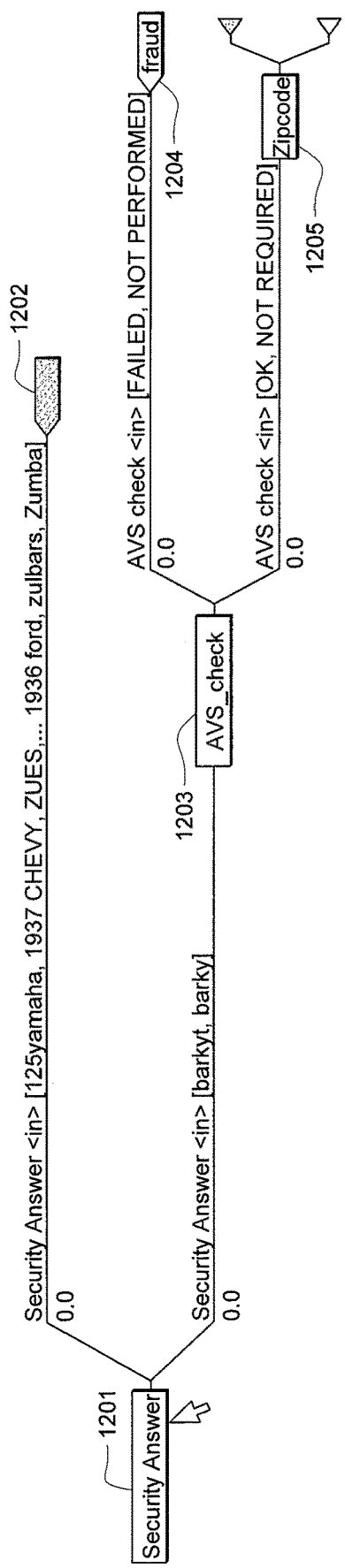

FIG. 12 shows one portion of the generated decision tree that says "if the security answer is "barkyt" or "barky," and the AVS check is failed or not performed, then the transaction is deemed to be fraudulent. Otherwise, if the AVS check is okay or not required, then the rest of the decision tree would indicate, "if the transaction is in the following set of zip codes, then it is deemed to be fraudulent." At this point, the decision tree can be translated into a simple SQL expression that can be applied to the entire database of known accounts, in order to identify accounts that have the same attributes as the cluster of accounts that has just now been identified as potentially fraudulent.

Note that the database that the fraud rule is run against can be the same database, for example database 108 (FIG. 1) that was used to begin the drill-down process, as discussed above, and/or the fraud rule can be sent to one or more databases (not shown) remote from the originating database via communication device 110 (FIG. 1). This then allows for fraud detection rules to be circulated among different databases, perhaps at different credit monitoring facilities.

Figure 13:
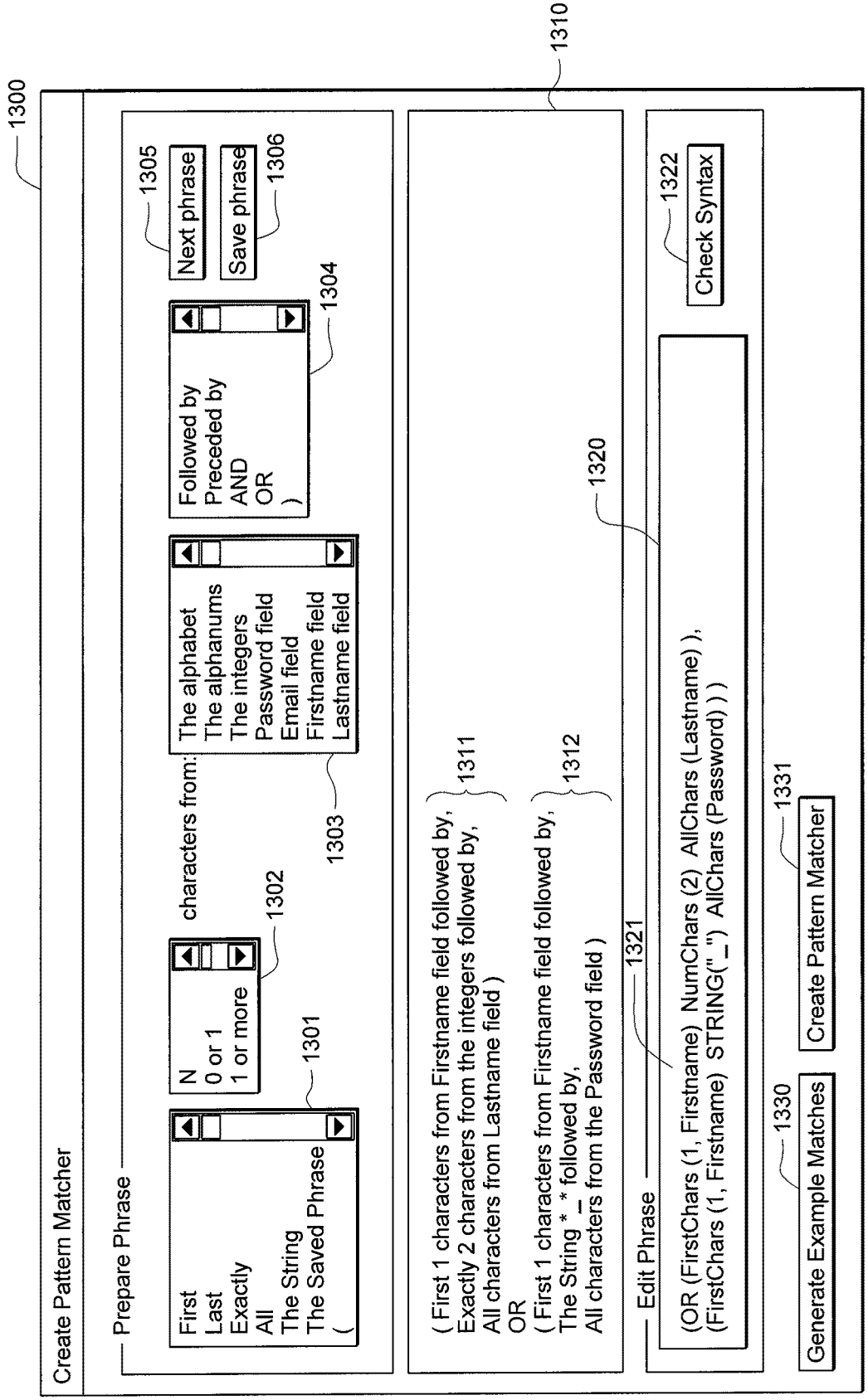

FIG. 13 shows one embodiment of a method for creating a pattern for use in pattern matcher 101, as shown in FIG. 1. Assuming that the user who has been studying the screen and looking at various items such as passwords notices a pattern. For example, the user notices that there are several passwords that have one character from the target's first name, then two digits, which could be two random digits, then the target's last name. Another pattern that the user, for example, has noticed is that the password could have one character from the target's first name followed by a specific string of digits followed by the target's last name.

The user then brings up pattern match generator 1300 as shown in FIG. 13 and begins to create a pattern matcher. In this example, the user prepares an expression consisting of two compound phrases connected by an OR condition. The user begins by using box 1301 and selecting what the first part of the pattern will be, in this case the user selects the word "first." Then using box 1302, the user selects N (which would mean the first N characters) and another box pops up to allow the user to select the specific value for N. In our case, the user selects "1." The user would then go to box 1303 and select where those characters are from. In this case, the user would select "First Name Field" and then using box 1304 would select the "followed by" notation. The user would then press the "Next Phrase" button and then would repeat back at box 1301 to select the word "exactly" followed by the "2" from box 1302, followed by "the integers" from box 1303. Then the user would select "followed by" from box 1304, then press the "Next Phrase" button again, then would repeat back at box 1301 and select the words "all" from box 1301, and then "Last Name Field" from box 1303.

The user would then press "OR" then "(" then repeat the process described above to prepare the second compound phrase as shown in 1312. The two compound phrases are shown in screen 1310 as the user is creating them, for example, the phrase that was just created is shown as field 1312. Assuming that the user wants to save the phrase, then box 1306 is used. If the user desires to generate sample strings that match the current expression, the user can use box 1330 which generates sample matches which correspond to the matching rules 1311 and 1312 and the user can therefore see on the screen if, after a number of samples have been created, the pattern matcher has being defined properly.

The user can create example matches using box 1330 and if the user desires to edit the phrase, that can be done via screen 1320 where the syntax for controlling the pattern matcher on the machine process is shown. If the user wants to edit the phrase, then the user can do so at this point; or if, after editing, the user wants to check the syntax to be sure that the syntax is still correct, then box 1322 can perform that function. When the user is finished defining a pattern matcher, then the user can create the pattern matcher using 1331. Sometimes the user may want to create a phrase, name it, and then reuse the named phrase in another pattern or in another portion of the same pattern. This action is accomplished by creating the pattern, such as pattern 1311 and then enabling the save phrase box 1306. The save-phrase box 1306 then allows the user to name that phrase and then, if desired, to create a new pattern matcher using that saved phrase as a building block.

FIG. 14 shows one embodiment 1400 of the use of a fraud rule to block, in real-time, fraudulent activity with respect to an imposter attempting to obtain credit history data from a database of credit information. Process 1401 controls the logon access to a credit database. This access can be, for example, so that the individual can access his/her credit history. As is well-known, before such access will be granted a process, such as process 1402, queries the accessing user for some combination of attributes uniquely pertaining to that user's data file. Some of the possible attributes are shown in process 1402, but any number and any combination can be required, and the combination can change depending upon security levels, or depending upon previous query answers.

Process 1403 reviews the answers, either one at a time or in bulk, and process 1404 compares the answers against one or more fraud cluster membership rules that have been generated, as discussed above. If one or more answers, such as the answer to the password or the answer to the e-mail address, etc, match a fraud cluster membership rule, then process 1405 acts to take whatever action is required by the system administrator, such as recording the machine identity of the user or blocking further access for this user, or invoking any other action defined by the system.

Process 1406, either acting concurrently with process 1404 or serial thereto, will either grant access to the credit information if all the queries are answered correctly or deny access in problem situations as is well-known. Note that the operation of process 1400 can be within the same processor (not shown) that controls the operation of the processes described for FIGS. 1 through 13 or can be in a processor remote from the processor that generated the fraud query rule.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for detecting fraud by displaying visual representations of data relating to entities-of-interest that are indicative of fraud, the system comprising:
    a first database that stores at least one attribute of a plurality of the entities-of-interest;
    a second database, remote from the first database, that stores at least one attribute of the plurality of the entities-of-interest;
    a pattern match generator that generates pattern matching rules;
    a pattern matcher that receives the pattern matching rules and applies the pattern matching rules to recognize links between at least one attribute of two or more of the entities-of-interest according to one or more of the pattern matching rules, where the pattern matching rules are generated using the pattern match generator;
    a layer builder that, based on the links recognized by the pattern matcher, creates an internal data structure that represents relationships between the two or more of the entities-of-interest in terms of types of links between the two or more of the entities-of-interest, number of links between the two or more of the entities-of-interest, and numerical strength of links between the two or more of the entities-of-interest;
    a cluster explainer that derives rules that define requirements for the two or more of the entities-of-interest to be included in a cluster and categorize the two or more of the entities-of-interest that satisfy the defined requirements as potentially fraudulent entities, wherein the derived rules are applied to one or more first database-related transactions in real time and to one or more second database-related transactions in real-time to detect credit history transactions categorized as potentially fraudulent; and
    an interface for displaying a visual representation of the relationships between the two or more of the entities-of-interest, as expressed by the layer builder, to a user, and
    an editor for receiving an input from the user that indicates a user-generated requirement to modify the defined requirements to be included in the cluster and categorized as potentially fraudulent entities;
    where displaying the visual representation comprises:
        displaying in one of a plurality of locations of the interface different types of links between the two or more of the entities-of-interest as different colors, and displaying in another of the plurality of locations of the interface the numerical strength of links between the two or more of the entities-of-interest as lines of different thickness between the two or more of the entities-of-interest.

2. The system of claim 1, wherein the editor is configured to query the first database to determine if additional entities-of-interest satisfy modified requirements to be included in the cluster and categorized as a potentially fraudulent entity.

3. The system of claim 2, wherein the pattern matcher creates a dataset comprising a list of the two or more of the entities-of-interest and the links by which they are connected; and
    the dataset is loaded into the layer builder.

4. The system of claim 3, further comprising:
    a pattern editor that creates new pattern matching rules based on additional requirements input by the user.

5. The system of claim 1, wherein the at least one attribute includes a credit history of an individual.

6. The system of claim 1, wherein the at least one attribute includes insurance claims.

7. The system of claim 1, wherein the at least one attribute includes debit card transactions.

8. A fraud detection method, the method comprising:
    searching a first database that stores at least one attribute of a plurality of entities-of-interest;
    searching a second database that stores at least one attribute of the plurality of entities-of-interest;
    generating pattern matching rules;
    applying the generated pattern matching rules to recognize links between at least one attribute of two or more of the entities-of-interest according to one or more of the pattern matching rules;
    expressing relationships in terms of types of links between the two or more of the entities-of-interest, number of links between the two or more of the entities-of-interest, and numerical strength of links between by the two or more of the entities-of-interest;
    electronically displaying the relationship between the two or more of the entities-of-interest, to a user;
    deriving rules that define requirements for the two or more of the entities-of-interest to be included in a cluster and categorize the two or more of the entities-of-interest that satisfy the defined requirements as potentially fraudulent entities, wherein the derived rules are applied to one or more first database-related transactions in real time and to one or more second database-related transactions in real-time to detect credit history transactions categorized as potentially fraudulent; and
    receiving input from the user to modify the defined requirements to be included in the cluster and categorized as potentially fraudulent entities; and
    electronically displaying different types of links between the two or more of the entities-of-interest as different colors, and displaying the numerical strength of links between the two or more of the entities of interest as lines of different thickness between the two or more of the entities-of-interest.

9. The method of claim 8, further comprising:
    querying the first database to determine if additional entities satisfy the modified requirements to be included in the cluster and categorized as a potentially fraudulent entity.

10. The method of claim 9, further comprising:
    creating a dataset comprising a list of the two or more of the entities-of-interest and the links by which they are connected; and
    loading the dataset.

11. The method of claim 10, further comprising:
    creating new pattern matching rules based on additional requirements input by the user.

12. The method of claim 8, wherein the at least one attribute includes a credit history of an individual comprising an entity of interest.

13. The method of claim 8, wherein the at least one attribute includes insurance claims.

14. The method of claim 8, wherein the at least one attribute includes debit card transactions.

* * * * *